United States Patent

Hoshi

[11] Patent Number: 6,064,353
[45] Date of Patent: May 16, 2000

[54] MULTI-EYE IMAGE DISPLAY APPARATUS

[75] Inventor: Hiroaki Hoshi, Yokohama, Japan

[73] Assignee: Canon Kabushiki Kaisha, Tokyo, Japan

[21] Appl. No.: 08/909,530

[22] Filed: Aug. 12, 1997

Related U.S. Application Data

[63] Continuation of application No. 08/355,602, Dec. 14, 1994, abandoned.

[30] Foreign Application Priority Data

Dec. 22, 1993 [JP] Japan ................................ 5-346495

[51] Int. Cl.[7] ................................................ G09G 3/36
[52] U.S. Cl. .................................. 345/7; 345/8; 359/630
[58] Field of Search .................................. 345/7–8, 4–6; 348/51–54, 115; 359/462, 463–468, 630–633; 349/11, 15

[56] References Cited

U.S. PATENT DOCUMENTS

| | | |
|---|---|---|
| 4,805,988 | 2/1989 | Dones . |
| 4,994,794 | 2/1991 | Price et al. ................................ 345/7 |
| 5,002,363 | 3/1991 | Tanaka .................................. 359/474 |
| 5,034,809 | 7/1991 | Katoh ..................................... 358/88 |
| 5,091,784 | 2/1992 | Someya et al. ........................ 345/87 |
| 5,281,957 | 1/1994 | Schoolman .............................. 345/8 |
| 5,291,338 | 3/1994 | Bezard et al. . |
| 5,572,343 | 11/1996 | Okamura et al. ...................... 345/8 |

FOREIGN PATENT DOCUMENTS

| | | |
|---|---|---|
| 0539907A2 | 5/1993 | European Pat. Off. . |
| 0 640 859 A2 | 3/1995 | European Pat. Off. . |
| 0 643 314 A2 | 3/1995 | European Pat. Off. . |
| 2 129 994 | 5/1984 | United Kingdom . |
| 2206421 | 1/1989 | United Kingdom . |
| WO9016004 | 12/1990 | WIPO . |

OTHER PUBLICATIONS

I.E. Sutherland, "A head–mounted three dimensional display", Fall Joint Computer Conference, 1968, pp. 757–763.

English language translation of Japanese priority documents JP 02888/93 and JP 04369/93, filed Aug. 26, 1993 and Jan. 27, 1994, respectively, for EPO 0640 859 A2, published Mar. 1, 1995.

*Primary Examiner*—Lun-Yi Lao
*Attorney, Agent, or Firm*—Morgan & Finnegan, LLP

[57] ABSTRACT

This invention relates to a multi-eye image display apparatus. The apparatus has right-eye moving image display for emitting light to display a moving image for the right eye, right-eye still image display for emitting light to display a still image for the right eye, left-eye moving image display for emitting light to display a moving image for the left eye, left-eye still image display for emitting light to display a still image for the left eye and optical device for guiding a light beam from the right-eye moving image display and a light beam from the right-eye still image display to the pupil of the right eye of an observer and guiding a light beam from the left-eye moving image display and a light beam from the left-eye still image display to the pupil of the left eye of the observer, whereby the observer can make fusion between the still images and fusion between the moving images.

11 Claims, 5 Drawing Sheets

MULTI-EYE IMAGE DISPLAY APPARATUS

This is a continuation of co-pending application Ser. No. 08/355,602, filed on Dec. 14, 1994, now abandoned.

BACKGROUND OF THE INVENTION

1. Field of the Invention

The present invention relates to a multi-eye image display apparatus with optical systems each for guiding an image (image information) being displayed on a compact display device for example such as a liquid crystal display device, a CRT, etc. to form an enlarged virtual image thereof in front of an observer so that the observer can observe the virtual image.

2. Related Backaround Art

Large CRT display apparatus, projection TVs, etc. have been conventionally used as apparatus for displaying a large-screen image with presence from image information displayed on an image display device such as a liquid crystal. These apparatus, however, had problems of various restrictions on operating circumstances; for example, they needed a large space, it was hard to observe a good image without dark surroundings, etc.

Because of the problems, various multi-eye image display apparatus have been recently proposed in such an arrangement that beams are projected from images displayed on image display devices directly to the eyes (the observer's pupils) through optical systems disposed very close to the face so as to permit the observer to observe large-screen image information, a stereoscopic image, or a panorama image.

Among the multi-eye image display apparatus, a goggle-type head mounted display (hereinafter referred to as "HMD") to be mounted on the head is relatively easy of observation of virtual large-screen images as enlarged from images displayed on compact liquid crystal displays (hereinafter referred to as "LCD") by optical systems such as lenses.

For example, Japanese Patent Application No. 5-92113 discloses a multi-eye image display apparatus for HMD using changing means which can change a convergence angle of displayed images for the left and right eyes whereby the apparatus can display not only a stereoscopic image but also a two-dimensional panorama image in a variable aspect ratio and can also display a mixed image of a stereoscopic image and a two-dimensional image, and further using combiner elements for superimposing image information of external view on such image information whereby the observer can observe the both images' information at a time.

In the conventional multi-eye image display apparatus, for example, supposing an angle of view of the optical systems is 30° and the position of the virtual images of the displayed images is located 1 m ahead of the observer, the LCDs a little less than an inch are perceived as displays of about 30 inches 1 m ahead on calculation. However, though the angle of view was actually 30°, there was no information giving the sense of distance, "1 m ahead." Because of this, the observer was not always able to perceive them as displays of 30 inches 1 m ahead, but tended to perceive that there were compact displays in front of the eyes, raising a problem of being hard to realize appreciation with presence on a large screen, with feeling of being more natural, but without feeling of fatigue.

In addition, the conventional multi-eye image display apparatus were so arranged that, for example, the convergence angle of left and right displayed images was changed to shift the virtual images in the horizontal direction whereby an overlapping region of the left and right images was changed so as to change the aspect ratio of a displayed image for the both eyes. In this case, for fusion of the left and right images depending upon the overlapping region, common parts of the displayed images were finally left to human processing by brains after by the retinas. This caused a problem that it was difficult for the observer to naturally follow a change in the aspect ratio upon switching of scenes, resulting in the observer's feeling tired and thus making long-period observation difficult.

SUMMARY OF THE INVENTION

An object of the present invention is to provide a multi-eye image display apparatus suitable for HMD or the like which properly displays still images for the both eyes around moving images for the both eyes whereby an observer can observe images displayed as enlarged virtual images ahead of the observer under good conditions with presence but without feeling tired.

More particularly, an object of the present invention is to provide a multi-eye image display apparatus which can facilitate perception of the positions and sizes of virtual images and which can facilitate the fusion of left and right images by such an arrangement that still images are provided around moving images formed by moving image displaying means and that at least parts of the still images are made of a same image or at least parts are made of same images with parallax.

An embodiment of the multi-eye image display apparatus of the present invention for achieving the above object is a multi-eye image display apparatus comprising:

right-eye moving image display means for emitting light to display a moving image for the right eye;

right-eye still image display means for emitting light to display a still image for the right eye;

left-eye moving image display means for emitting light to display a moving image for the left eye;

left-eye still image display means for emitting light to display a still image for the left eye; and optical means for guiding a light beam from said right-eye moving image display means and a light beam from said right-eye still image display means to the pupil of the right eye of an observer and guiding a light beam from said left-eye moving image display means and a light beam from said left-eye still image display means to the pupil of the left eye of the observer, so that said observer can make fusion between said still images and fusion between said moving images.

In a preferred embodiment, said moving images are images having a parallax between them.

In a preferred embodiment, at least parts of said still images are same images.

In a preferred embodiment, said same images have a parallax between them.

In a preferred embodiment, said optical means forms virtual images of said moving images and still images in a same plane.

In a preferred embodiment, said still image display means each have an optically transparent base on which a still image is recorded in a stationary manner.

Another embodiment of the multi-eye image display apparatus of the present invention is a multi-eye image display apparatus comprising:

right-eye image display means for emitting light to display an image for the right eye;

means for emitting light to display a specific mark for the right eye;

left-eye image display means for emitting light to display an image for the left eye;

means for emitting light to display a specific mark for the left eye having a same shape as the specific mark for the right eye; and optical means for guiding a light beam from the right-eye image display means and a light beam from the specific mark for the right eye to the pupil of the right eye of an observer and guiding a light beam from the left-eye image display means and a light beam from the specific mark for the left eye to the pupil of the left eye of the observer, so that the observer can make fusion between the specific marks and fusion between the images.

In a preferred embodiment, the images are moving images.

In a preferred embodiment, the images have a parallax between them.

In a preferred embodiment, said optical means forms virtual images of said images and specific marks in a same plane.

In a preferred embodiment, said specific marks have asymmetry with respect to a direction of the width of the observer's pupils.

Some specific examples of the image display apparatus of the present invention will be described in the below description of the preferred embodiments.

DETAILED DESCRIPTION OF THE PREFERRED EMBODIMENTS

Figure 1:
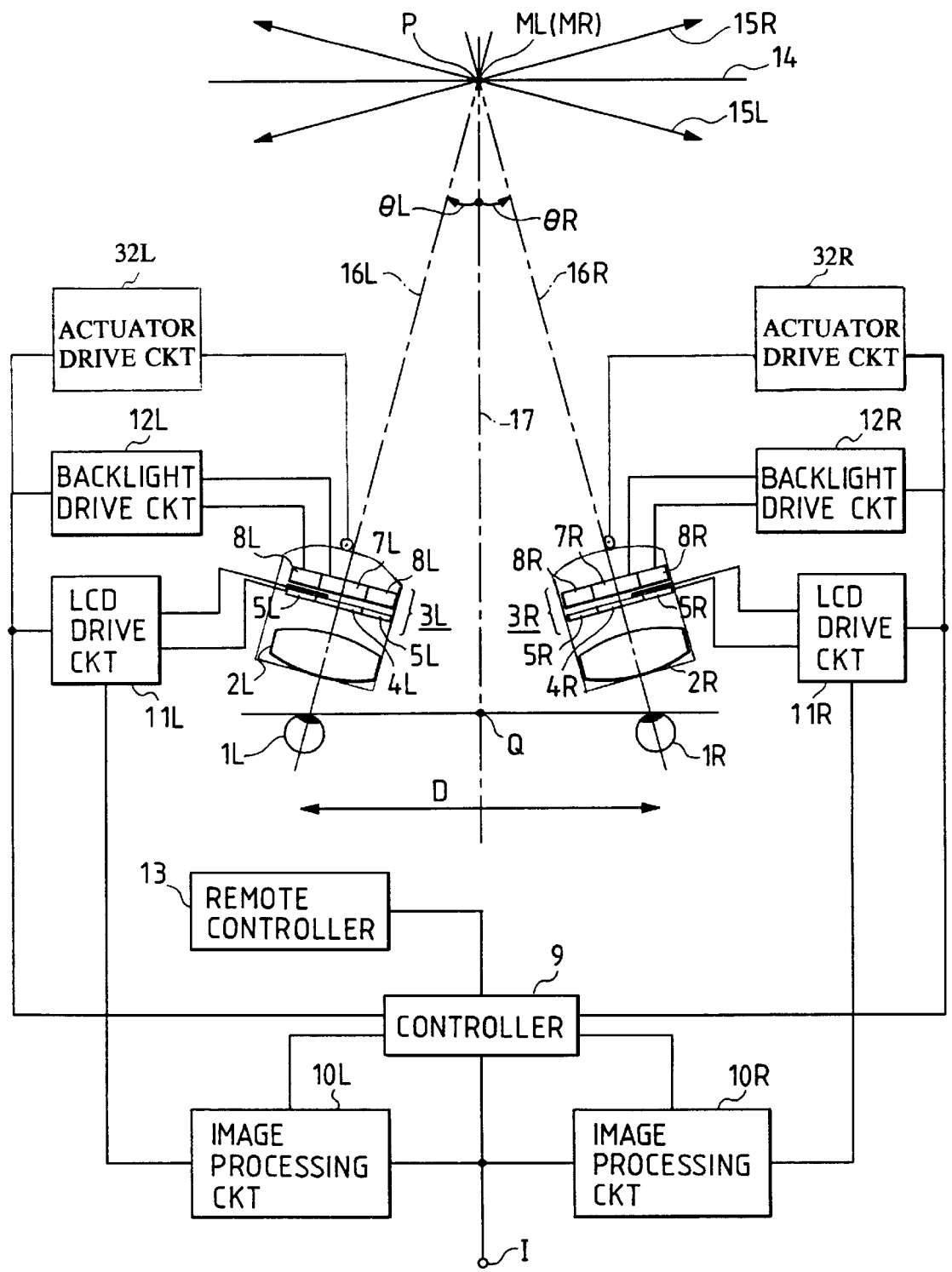
FIG. 1 is a schematic drawing of major part of embodiment 1 in which the present invention is applied to the head mounted display (HMD)

FIG. 1 is a schematic drawing to show the major part of embodiment 1 where the present invention is applied to the head mounted display (hereinafter referred to as "HMD").

In FIG. 1, reference symbols 1L, 1R designate the left eye and the right eye, respectively, of an observer. In the following description, letters L, R mean elements for the left eye and for the right eye, respectively. Further, D is a distance between the pupils of the both eyes (i.e., the base length). Also, Q is a middle point of the base length D.

Further, 3L, 3R each are liquid crystal display means (hereinafter also referred to as "LCD"), each of which has a first or second liquid crystal display portion (hereinafter referred to as "moving image LCD") 4L, 4R as moving image display means illuminated by a backlight 7L, 7R as a first or second illuminating portion, and a third or fourth liquid crystal display portion (hereinafter referred to as "reference LCD") 5L, 5R as still image display means illuminated by a backlight 8L, 8R as a third or fourth illuminating portion.

Each of the moving image LCD 4L, 4R and the reference LCD 5L, 5R is made of a transmission-type liquid crystal, which is composed of a color filter and two polarizing plates set on the two surfaces thereof in the arrangement of crossed Nicols. The moving image LCD 4L, 4R and the reference LCD 5L, 5R each are arranged in close fit or incorporated with the backlight 7L, 7R and the backlight 8L, 8R, respectively, but FIG. 1 shows them as separated from each other for convenience' sake. A number of pixels in the moving image LCD 4L, 4R is greater than that in the reference LCD 5L, 5R.

Each of 2L and 2R is a lens system as optical means, through which a light beam from the liquid crystal display portion 3L, 3R is guided to the observer's pupil whereby a displayed image on the liquid crystal display portion 3L, 3R is displayed as a virtual image ahead of the observer. 11L, 11R is an LCD drive circuit, which drives the moving image LCD 4L, 4R and the reference LCD 5L, 5R. Also, 12L, 12R is a backlight drive circuit, which drives the backlight 7L, 7R and the backlight 8L, 8R.

Numeral 13 denotes a commander or remote controller. 10L, 10R is an image processing circuit, which supplies image information to the LCD drive circuit 11L, 11R. Numeral 9 denotes a controller for drive-controlling various circuits. Letter I denotes a signal input terminal.

Numeral 14 designates a virtual image plane of the liquid crystal display portion 3L, 3R by the lens system 2L, 2R. Letter P denotes a middle point of the virtual image plane 14. 15L, 15R is a virtual image of an image displayed on the liquid crystal display portion 3L, 3R. ML, MR represents a middle point of the virtual image 15L, 15R, respectively. 16L, 16R is an optical axis for the left eye or for the right eye, respectively.

Numeral 17 represents a perpendicular bisector (plane) of the base length D, which intersects at point Q with the base length and at point P with the virtual image plane. θL, θR is an angle which the optical axis 16L, 16R, respectively, makes with the perpendicular bisector 17 (hereinafter referred to as "convergence angle").

In the present embodiment, image information and accompanying control information is supplied through the signal input terminal I from an external multi-eye camera, a memory such as a tape or a disk, or a communication line, etc. and is then put into the image processing circuits 10L, 10R and controller 9, respectively. With the control information put into the controller 9 and identification information on either left or right image attached to the header of the picture information, the image processing circuit 10L, 10R separates the left or right image from the other, subjects it to necessary image processing, and thereafter makes the moving image LCD 4L, 4R display a moving image through the LCD drive circuit 11L, 11R.

The present embodiment shows an example where information of a stereoscopic moving image is displayed. Namely, the controller 9 determines from the input control signal if the information is of a stereoscopic moving image. Then, determining the convergence angles θL, θR for HMD, it drives an actuator drive circuit 32L, 32R to set the optical axis 16L, 16R of HMD to the predetermined convergence angle θL, θR before display of moving image. Further, receiving a control signal and an input signal from the commander 13, the controller 9 selects an image to be displayed on the reference LCD 5L, 5R out of candidates of reference still images for stereoscopic images preliminarily prepared, and displays it thereon through the LCD drive circuit 11L, 11R.

The reference still image 5L, 5R to be selected at this point is supplied from a ROM inside the commander 13 or a reloadable memory such as an IC card etc. The display of reference still image 5L, SR is given before display of moving image, but the apparatus is so arranged that the observer can again select another image depending upon the contents of moving image through the commander 13. The backlights 7L, 7R, 8L, 8R start illumination at a matched timing with display start of moving image LCDs 4L, 4R and reference LCDs 5L, 5R.

The luminance of backlight 8L, 8R may be adjusted depending upon the contents of reference LCD 5L, 5R, or the luminance may be adjusted to effect fade-in or fade-out. Also, the apparatus may be so arranged that the adjustment of luminance or an on/off control of illumination is made through the commander 13 by observer's will.

Figure 2:
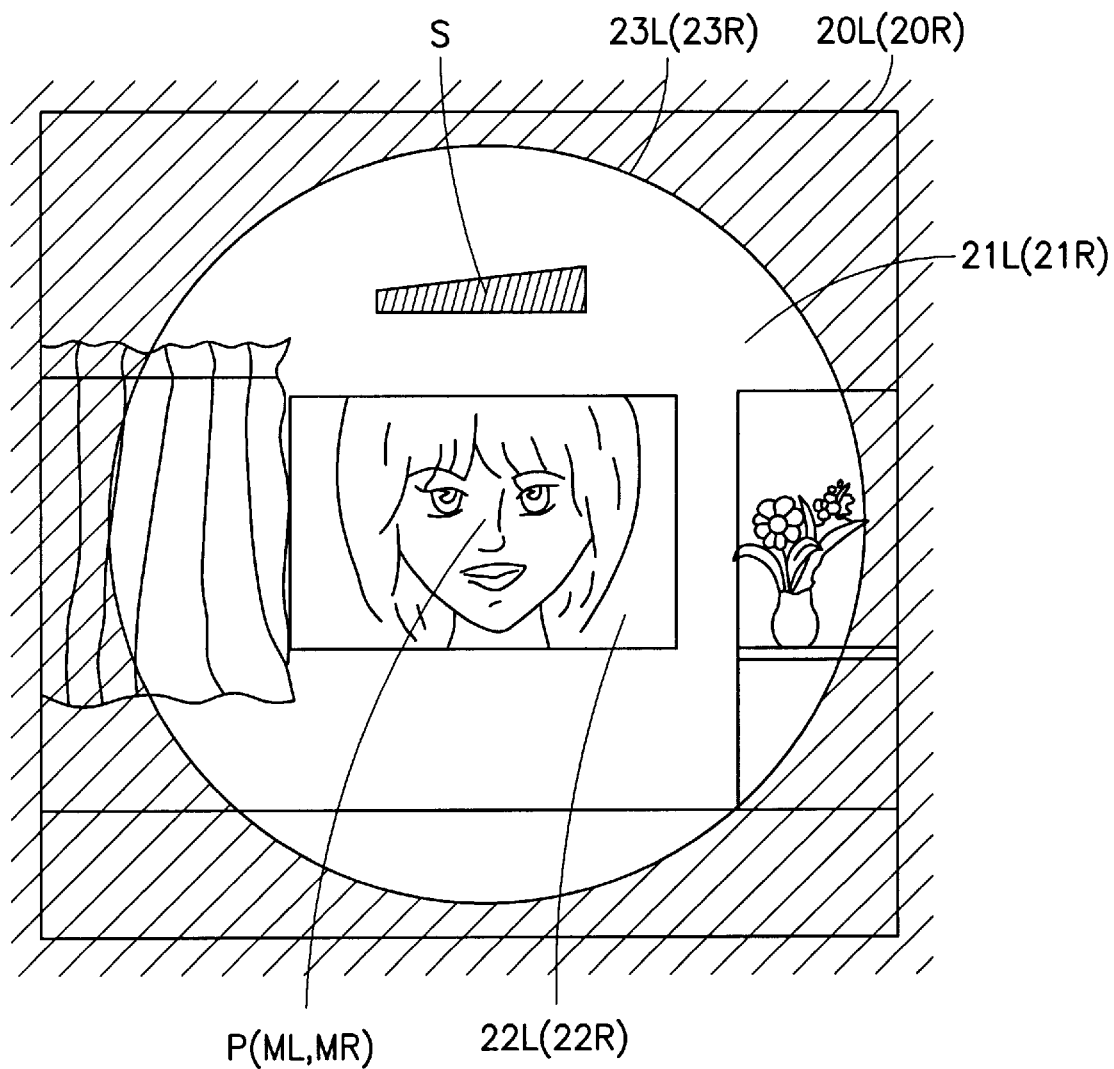
FIG. 2 is an explanatory drawing to illustrate a displayed image in FIG. 1.

FIG. 2 is an explanatory drawing of image information (virtual images) observed with the HMD of the present invention.

In FIG. 2, 20L, 20R corresponds to the virtual image 15L, 15R in FIG. 1. Further, 21L, 21R corresponds to the virtual image of the displayed image on the reference LCD 5L, 5R; and 22L, 22R to the virtual image of the displayed image on the moving image LCD 4L, 4R. 23L, 23R is an exit pupil of lens system 2L, 2R, by which the virtual image 21L, 21R is eclipsed in the outside region of the pupil where the image is out of observer's vision.

Point P is the center of the virtual image plane 14 while ML, MR are the center of the left or right virtual image. The points P, ML, MR are coincident with each other.

The virtual images 22L, 22R of the moving image LCDs and the still images 21L, 21R of the reference LCDs are parallax images with convergence angles θL, θR, so that corresponding points in same images with parallax are coincidently superimposed on each other on the entire image plane. The still image 21L, 21R of the reference LCD is made of an image preliminarily photographed so as to match with a 30-inch screen in an aspect ratio of 3:2, which is the screen size of the virtual image 22L, 22R of the moving image LCD 1 m ahead. This makes the observer wearing the HMD perceive that there is actually a display of 30 inches 1 m ahead of the observer.

Further, even with changes of various scenes in the virtual images 22L, 22R of the moving image LCDs, the fusion of parallax images with convergence angles θL, θR is constantly continued using information of still images 21L, 21R, regardless of the contents of the virtual images 22L, 22R. This realizes display of a more natural stereoscopic image, so that the observer can appreciate the display for a long time period with little feeling tired.

Although the stereoscopic image is more natural and effective for the still images 21L, 21R on the reference LCDs in the present embodiment, the effect of the present invention can also be achieved similarly as described above by such an arrangement that two-dimensional still images, i.e., same images without parallax, are displayed on the left and right reference LCDs 5L, 5R in order to save the capacity of memory.

Figure 3:
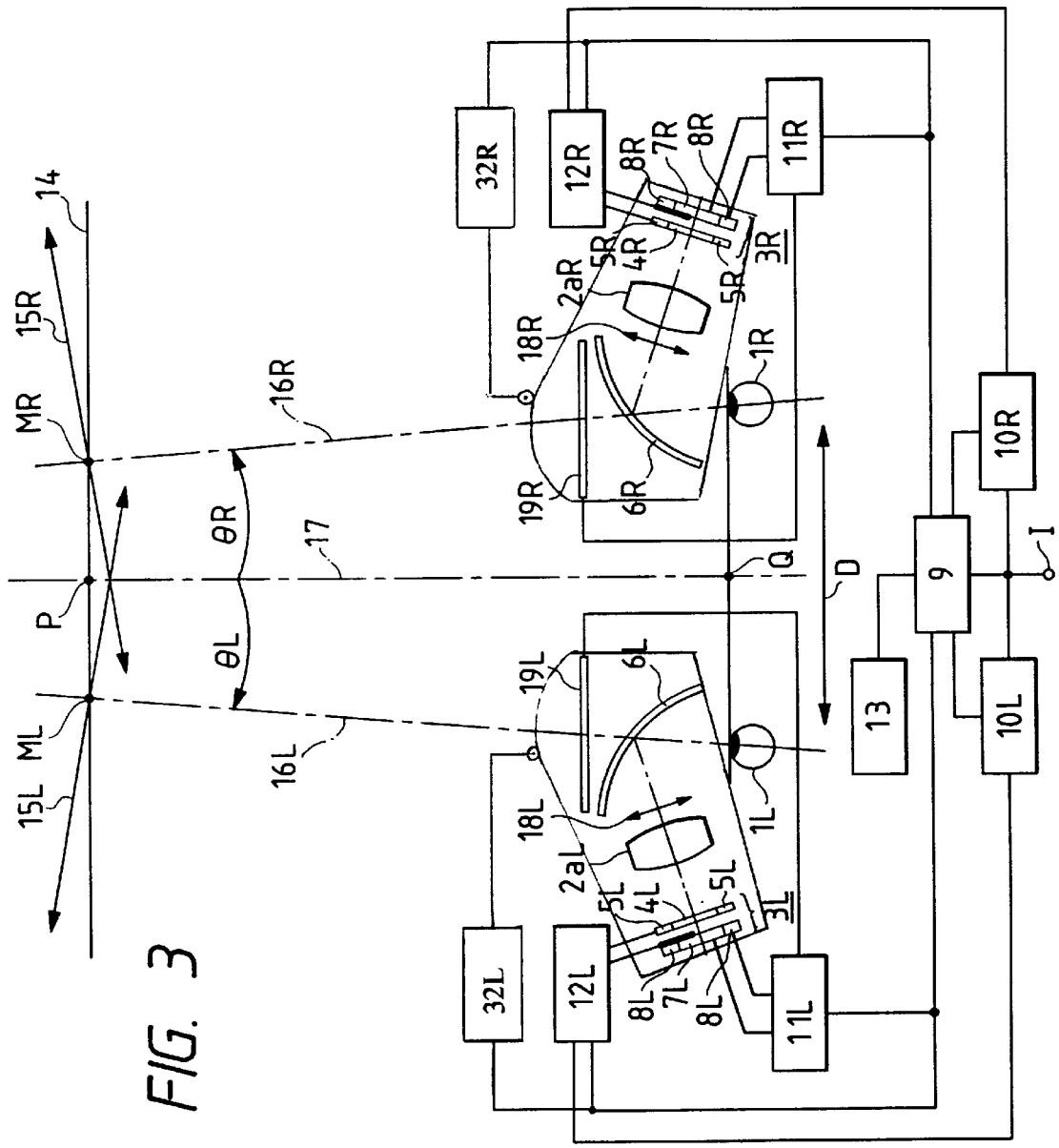
FIG. 3 is a schematic drawing of major part of embodiment 2 in which the present invention is applied to the head mounted display (HMD)

FIG. 3 is a schematic drawing to show the major part of embodiment 2 where the present invention is applied to a seethrough-type HMD.

The present embodiment is different from embodiment 1 of FIG. 1 in that the HMD is of a seethrough type having a function to display images from LCDs 3L, 3R and an image such as an external view in a spatially superimposed manner using-aspherical combiners 6L, 6R so as to permit the observer to simultaneously observe the both images, and is constructed in the same structure except therefore In FIG. 3, same elements as those shown in FIG. 1 are denoted by the same reference numerals.

The present embodiment is so arranged that images from LCDs 3L, 3R are once focused at secondary image positions 18L, 18R by lens systems 2aL, 2aR and the images at the secondary image positions 18L, 18R are guided to the pupils of the two eyes 1L, 1R by the combiners 6L, 6R, whereby virtual images 15L, 15R of the images on the LCDs 3L, 3R are formed in the vicinity of the virtual image plane 14.

A field stop as detailed later is located at each secondary image position 19L, 18R. 19L, 19R is a liquid crystal shutter, which is a shutter for performing an on/off,control of input of the seethrough external field image therethrough into the pupil 1L, 1R.

The present embodiment shows an example where the seethrough-type HMD does not display a stereoscopic image but does a mixed image of two-dimensional images and a stereoscopic image where 50% of virtual images 15L, 15R for the left and right eyes are superimposed on each other. The overlapping region becomes a stereoscopic image, while the non-overlapping regions two-dimensional images.

The center ML of the virtual image 15L for the left eye is shifted to the left from the middle point P, so that it is located at a position nearly coincident with an image of the left edge of the virtual image 15R for the right eye. This is also the case for the virtual image 15R for the right eye. Thus, the convergence angles θL, θR are wider than those in embodiment 1 of FIG. 1.

In the present embodiment, based on control information supplied through the signal input terminal I, the controller 9 drives the actuator drive circuit 32L, 32R to set the convergence angles θL, θR for displaying the predetermined mixed image of two-dimensional images and a stereoscopic image. Receiving the control information and an input signal from the commander 13, the controller 9 forms 30-inch displays in an aspect ratio of 2:3 at 1 m ahead in correspondence with the mixed image of two-dimensional images and a stereoscopic image so as to overlap 50% with each other.

Namely, the controller 9 selects reference still images matching with a display in an aspect ratio of 2:4.5 at present 1 m ahead and displays them on the reference LCDs 8L, 8R. These two functions achieve fusion of the mixed image of two-dimensional images and a stereoscopic image overlapping 50%.

In this connection, the apparatus is so arranged that a signal from the controller 9 is given through the backlight drive circuit 12L, 12R to close the liquid crystal shutter 19L, 19R so as to interrupt the external view and that, turning off the backlight 7L, 7R for the moving image LCD 4L, 4R or making the moving image LCD 4L, 4R display uniform white or black, illumination is effected by the backlight 8L, 8R for reference LCD 5L, 5R, which facilitates the fusion of reference still images.

After completion of the above setting, the mixed image of two-dimensional images and a stereoscopic image are displayed on the moving image LCDs 4L, 4R, whereby the observer can constantly appreciate the mixed moving image of two-dimensional images and a stereoscopic image in a more natural state without being affected by switch of scenes in the image and without feeling tired.

When the observer desires to watch the seethrough image of the external view, a necessary operation is just opening the liquid crystal shutters 19L, 19R. In that case, the seethrough external view can be recognized better by turning off the backlights 8L, 8R and reference LCDs 5L, 5R to stop the display of the reference still images.

However, it causes no problem where the observer wants to watch mainly the seethrough external view, but the size of the moving image displayed is influenced by the external field. Namely, the size of the moving image is perceived smaller when the observer looks near the observer's hand in the seethrough condition; conversely, the size is perceived larger when the observer gazes into a distance in the seethrough condition.

If a weight is placed on observation of the image information displayed on the moving image LCDs 4L, 4R rather than the seethrough external view, the reference LCDs 5L, 5R are driven to display the still images and the backlights 8L, 8R are turned on to effect illumination in order to suppress the change of display size due to the seethrough external view. The liquid crystal shutters 19 can be closed with necessity.

Figure 4:
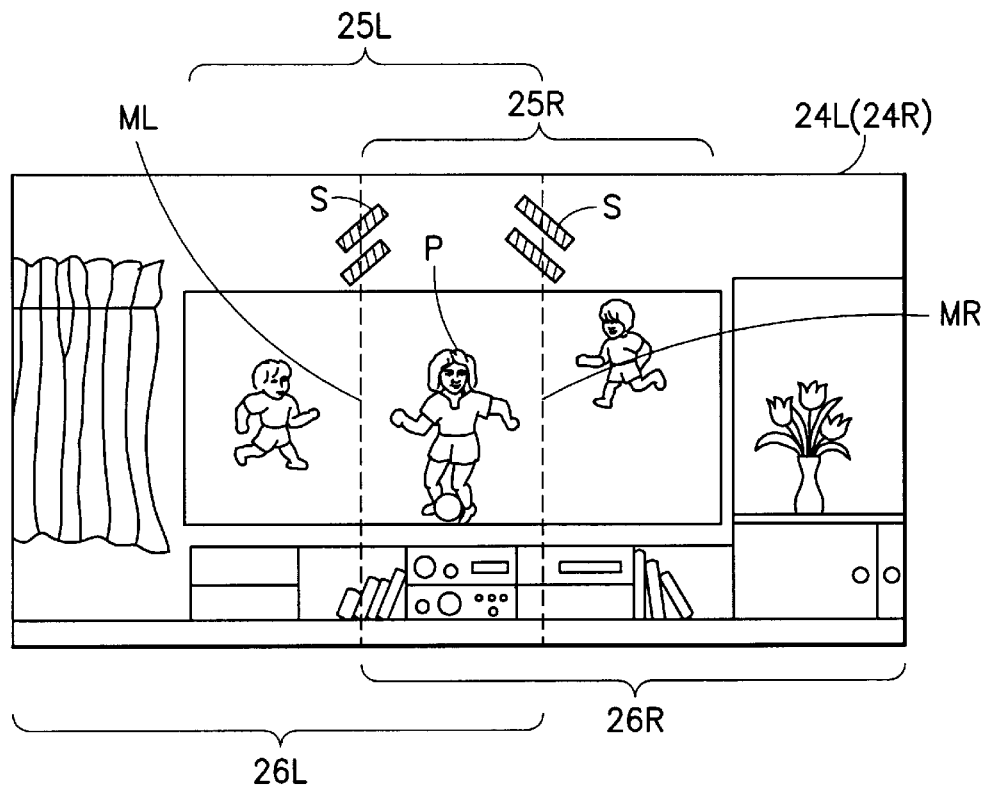
FIG. 4 is an explanatory drawing to illustrate a displayed image in FIG. 3.

FIG. 4 is an explanatory drawing to illustrate image information observed with the seethrough-type HMD of the present embodiment.

In FIG. 4, 24L, 24R is a field frame placed at the secondary image position 18L, 18R. 25L, 25R is the displayed image on the moving image LCD 4L, 4R; 26L, 26R the virtual image of the displayed image on the reference LCD 5L, 5R, and the points P, ML, MR are those described with FIG. 3.

The exit pupil is originally circular as shown in FIG. 2, but the present embodiment uses the field frames 24L, 24R provided at the secondary image positions 18L, 18R to shape the field matching with the shape of the displayed image, which makes the displayed image more natural and easier to watch. Here, the effect of the present invention can also be attained similarly as described previously by using two-dimensional images without parallax as the reference still images 26L, 26R similarly as in the case of the images shown in FIG. 2.

Figure 5:
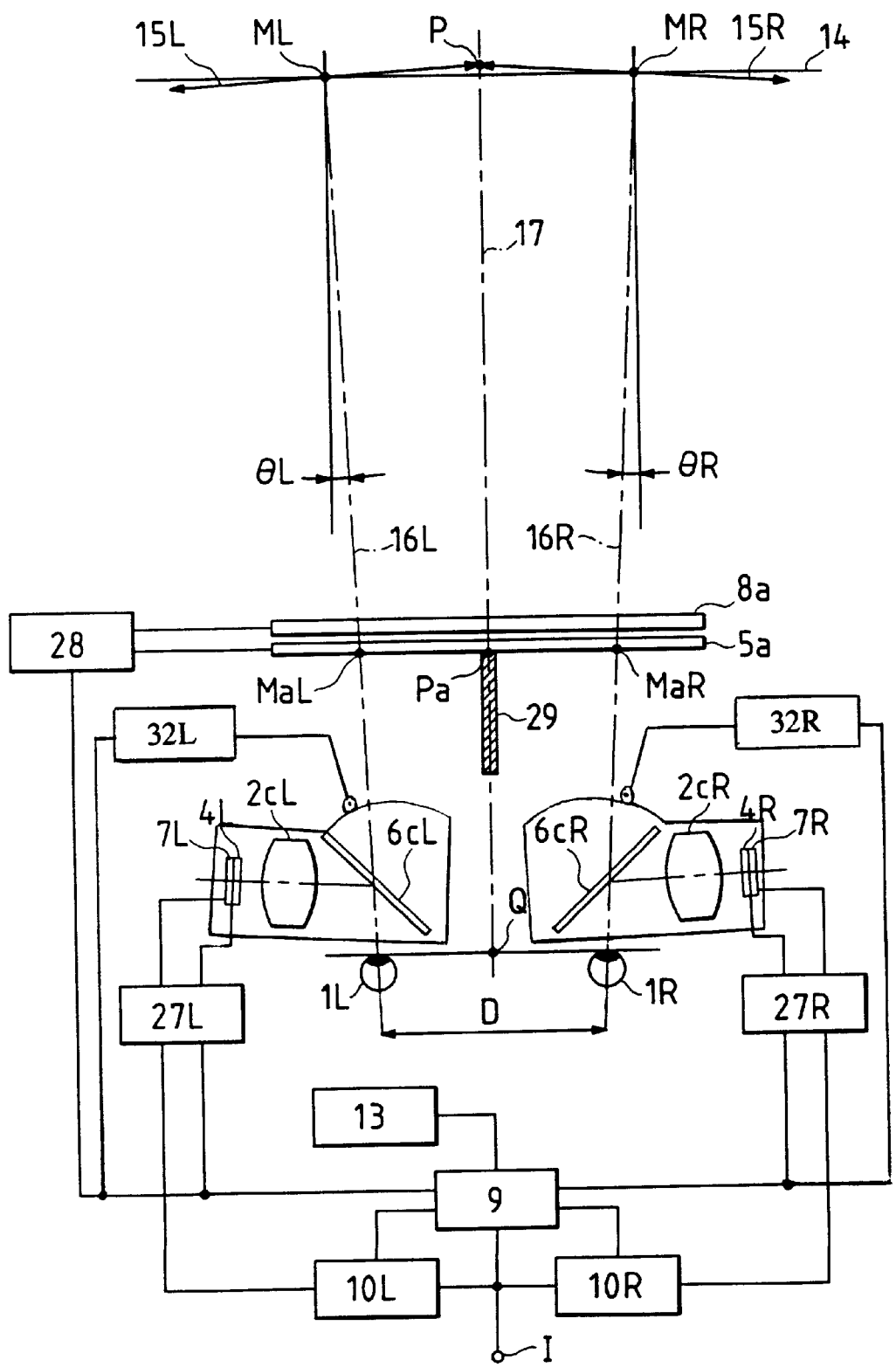
FIG. 5 is a schematic drawing of major part of embodiment 3 in which the present invention is applied to the head mounted display (HMD)

FIG. 5 is a schematic drawing to show the major part of embodiment 3 where the present invention is applied to the HMD.

The present embodiment is different from embodiment 1 of FIG. 1 in that combiners 6cL, 6cR each made of a plane half mirror are used to display virtual images 15L, 15R of displayed images on moving image LCDs 4L, 4R and a displayed image on a reference LCD 5a in a spatially combined manner whereby the observer can simultaneously observe the both images, and is constructed in the same structure except therefor. In FIG. 5, same elements as those shown in FIG. 1 are denoted by the same reference numerals.

In FIG. 5, 27L, 27R is a drive circuit for moving image LCD 4L, 4R and a drive circuit for backlight 7L, 7R thereof. Numeral 28 designates a drive circuit of reference LCD 5a and backlight 8a thereof.

The reference LCD 5a and backlight 8a cover a wider angle of view than an angle of view of display of moving images by the HMD in the present embodiment. Particularly, the horizontal angle of view covers a wide angle of view twice greater than the horizontal angle of view of the left and right moving images. Numeral 29 is a light shield plate, which is vertically set at the center Pa of the reference LCD 5a in order to separate the images for the left and right eyes from each other, that is, in order to prevent the left eye from observing the image for the right eye, and vice versa.

The present embodiment is so arranged that the images on the moving image LCDs 4L, 4R and the image on the reference LCD 5a are combined to be observed, and in that case, the images for the left and right eyes are juxtaposed adjacent to each other in a two-dimensional manner so as to allow observation of a panorama image. Namely, the virtual images ML, MR for the left and right eyes abut on each other at point P.

In the present embodiment, the optical axes 16L, 16R of the optical systems are set to have the convergence angles θL, θR matching with the two-dimensional panorama image, similarly as in embodiment 2, and the reference still image 5a for two-dimensional panorama is displayed. When the two-dimensional panorama image is displayed, the convergence angles θL, θR of the optical axes 16L, 16R of HMD are negative, but the convergence angles of the observer's visual axes are not negative.

The still image displayed on the reference LCD 5a indicates the black level in the region where the virtual images of the moving images are put. Since the reference LCD 5a of the present embodiment is a single panel, the image is also a two-dimensional image even in display of moving images having a stereoscopic image region as shown in FIG. 2 or FIG. 4 with a change of convergence angles, but the perceptive effect of the panel size is not damaged thereby at all.

Also, the apparatus is originally so arranged that with movement of the convergence angles θL, θR of the optical axes 16L, 16R by the actuator drive circuit 32L, 32R, the reference still image LCD 5a split corresponding to the left and right eyes is similarly moved. This achieves an effect to promote the fusional function.

However, because the reference LCD 5a of the present embodiment is a single panel, a single two-dimensional image is basically displayed unless time-division display is employed, which would lower the fusional effect.

Then, upon movement of the convergence angles, the displayed image on the reference LCD 5a is split into portions in the horizontal direction and the portions are moved matching with the movement of the virtual images through the drive circuit 28 by a movement signal from the controller 9. This achieves the same effect.

Originally, the reference still image is split similarly as the left and right virtual images are, which is effective to maintain the constancy of image fusion. To the contrary, the present embodiment employs a single panel, but obtains the same effect by displaying the spatially separate left and right images left and right of the light shield plate 29 with the center at the intersections MaL, MaR between the optical axes 16L, 16R and the LCD 5a, as described above.

The present embodiment showed an example where the position along the optical axis, of the real image 5a was different from that of the virtual images 15L, 15R. When the observer's eyes are focused on the virtual images, a decrease in the effect due to defocus is normally small because the reference image 5a is assistant.

Figure 6:
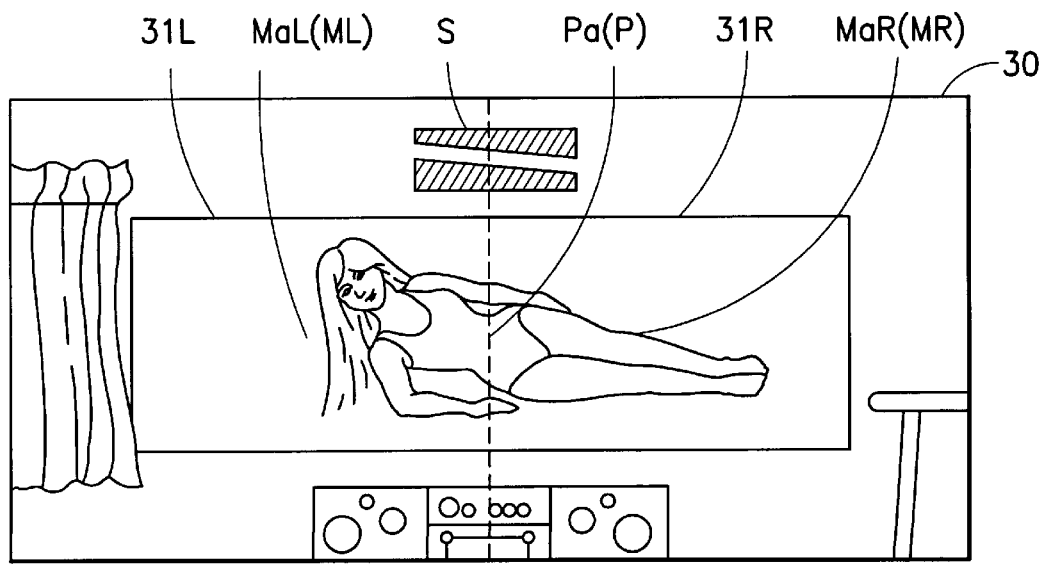
FIG. 6 is an explanatory drawing to illustrate a displayed image in FIG. 5.

FIG. 6 is an explanatory drawing to illustrate virtual images 31L, 31R and a reference real image 30 observed in the present embodiment.

It is important that the reference image in each of the three embodiments 1, 2, 3 as described above have patterns easy to be fused, especially in the overlapping portion. Particularly, the patterns in the fused portions influence the effect in the case of FIG. 4 or FIG. 6.

A fusion assist pattern S for that purpose is provided in the reference still image in each of the embodiments 1, 2, 3 of FIG. 2, FIG. 4, and FIG. 6. A preferable pattern employed is one by which horizontal positional deviation can be clearly perceived. Although a pattern of a circle or a cross may be employed, a pattern not so sensitive to vertical positional deviation is more preferable because it can decrease fatigue due to fusion.

However, considering that the image is horizontally long and that the vertical positional deviation is actually rare because of the mechanism, preferable patterns are simple patterns having asymmetry in the horizontal direction, as shown in the above embodiments.

Further, the above embodiments 1, 2, 3 employed the LCD panel(s) for displaying the reference still image(s), but a transmission-type still image such as a slide may be used instead of the LCD panel to attain the same function and effect of the present invention. Besides, to handle a change of the aspect ratio in the present embodiment, the still image may be exchanged for one matching with the changed aspect ratio.

Where the virtual images are observed with the reference still images placed at the same position as the moving image LCDs 7L, 7R as in the embodiment 1 or 2 of FIG. 1 or FIG. 3, a possible arrangement is such that images which are transparent in the overlapping region with the moving image LCDs 7L, 7R in the reference still images are prepared, the left and right images are transferred by the silver salt technology or by the printing technology, etc. onto a film or plastic thin plate, and a mechanism is provided for inserting left and right still image panels packaged in a field frame or the like in periphery, before the moving image LCDs 7L, 7R.

On the other hand, where there are the secondary image positions 18L, 18R as in embodiment 2 of FIG. 3, the same effect can be attained by setting the still image panels provided with the additional function of the field frames 24L, 24R at the secondary image positions 18L, 18R.

In the case of embodiment 3 of FIG. 5, the same effect is achieved by inserting a single still image panel at the position of LCD 5a.

What is claimed is:

1. A multi-eye image display apparatus comprising:
   right-eye moving image display means for emitting light to display a moving image for the right eye;
   right-eye still image display means for emitting light to display a two-dimensional still image for the right eye;
   left-eye moving image display means for emitting light to display a moving image for the left eye;
   left-eye still image display means for emitting light to display a two-dimensional still image for the left eye; and
   optical means for guiding, by a first convergence angle, a light beam from said right-eye moving image display means and a light beam from said right-eye still image display means to the pupil of the right eye of an observer and guiding, by a second convergence angle whose direction is different from a direction of said first convergence angle, a light beam from said left-eye moving image display means and a light beam from said left-eye still image display means to the pupil of the left eye of the observer, so that said observer can make fusion between said still images and fusion between said moving images, wherein at least parts of said still images are same images and, said optical means forms said moving images and still images in a same plane such that said still images are disposed to surround the outer periphery of said moving images.

2. The apparatus according to claim 1, wherein said moving images are images having a parallax between specific mark for the right eye; and
   optical means for guiding a light beam from said right-eye image display means and a light beam from said specific mark for the right eye to the pupil of the right eye of an observer and guiding a light beam from said left-eye image display means and a light beam from said specific mark for the left eye to the pupil of the left eye of the observer, so that said observer can make fusion between said specific marks and fusion between said images.

3. The apparatus according to claim 1, wherein said same images have a parallax between them.

4. The apparatus according to claim 1, wherein said still image display means each have an optically transparent base on which a still image is recorded in a stationary manner and wherein a region of the optically transparent base corresponding to a display region of said moving images is made optically transparent.

5. The apparatus according to claim 1, wherein said optical means have means for changing a convergence angle.

6. The apparatus according to claim 5, wherein said still image is changed corresponding to changing said convergence angle.

7. The apparatus according to claim 5, wherein said means for changing a convergence angle moves said still images in a horizontal direction in accordance with the change of the convergence angle.

8. A multi-eye image display apparatus comprising:
   right-eye image display means for emitting light to display an image for the right eye;
   means for emitting light to display a specific mark for observer's fusion for the right eye;
   left-eye image display means for emitting light to display an image for the left eye;
   means for emitting light to display a specific mark for observer's fusion for the left eye having a same shape as the specific mark for the right eye;
   wherein a vertical width of said specific marks, or a position of said specific marks in a vertical direction, varies along a direction of width of the observer's both eyes; and
   optical means for guiding, by a first convergence angle, a light beam from said right-eye image display means and a light beam from said specific mark for the right eye to the pupil of the right eye of an observer and guiding, by a second convergence angle whose direction is different from a direction of said first convergence angle, a light beam from said left-eye image display means and a light beam from said specific mark for the left eye to the pupil of the left eye of the observer, so that said observer can make fusion between said specific marks and fusion between said images, wherein said optical means forms virtual images of said images and specific marks in a same plane such that said images of said specific marks are disposed on a region outside said images.

9. The apparatus according to claim 8, wherein said images are moving images.

10. The apparatus according to claim 9, wherein said images have a parallax between them.

11. The apparatus according to claims 8, wherein said specific marks have asymmetry with respect to a direction of the width of the observer's pupils.

* * * * *

UNITED STATES PATENT AND TRADEMARK OFFICE
CERTIFICATE OF CORRECTION

PATENT NO. : 6,064,353
DATED : May 16, 2000
INVENTOR(S) : Hiroaki Hoshi

It is certified that error appears in the above-identified patent and that said Letters Patent is hereby corrected as shown below:

Title page,
Item [73], the following information is missing:

[*] Notice: This patent issued on a continued prosecution application filed under 37 CFR 1.53(d), and is subject to the twenty year patent term provisions of 35 U.S.C. 154(a)(2).

Column 5,
Line 7, "5L, SR" should read -- 5L, 5R --.

Column 6,
Line 3, "using-aspherical" should read -- using aspherical --.
Line 5, "therefore In" should read -- therefor. In --.
Line 16, "position 19L," should read -- position 18L, --
Line 17, "on/off,control"should read -- on/off control --.

Column 9, lines 65-67 to col. 10, lines 1-9, claim 2 should read as follows:
-- The apparatus according to Claim 1, wherein said moving images are images having a parallax between them. --.

Signed and Sealed this

Twelfth Day of February, 2002

*Attest:*

*Attesting Officer*

JAMES E. ROGAN
*Director of the United States Patent and Trademark Office*